United States Patent
Maeta et al.

(10) Patent No.: US 9,333,566 B2
(45) Date of Patent: May 10, 2016

(54) INDEXABLE CUTTING INSERT FOR MILLING

(71) Applicant: SUMITOMO ELECTRIC HARDMETAL CORP., Itami-shi, Hyogo (JP)

(72) Inventors: Atsuhiko Maeta, Itami (JP); Naoki Matsuda, Itami (JP)

(73) Assignee: SUMITOMO ELECTRIC HARDMETAL CORP., Hyogo (JP)

(*) Notice: Subject to any disclaimer, the term of this patent is extended or adjusted under 35 U.S.C. 154(b) by 98 days.

(21) Appl. No.: 14/129,062

(22) PCT Filed: Nov. 26, 2012

(86) PCT No.: PCT/JP2012/080447
§ 371 (c)(1),
(2) Date: Dec. 23, 2013

(87) PCT Pub. No.: WO2013/077443
PCT Pub. Date: May 30, 2013

(65) Prior Publication Data
US 2014/0126970 A1 May 8, 2014

(30) Foreign Application Priority Data

Nov. 25, 2011 (JP) .................................. 2011-257581

(51) Int. Cl.
*B23C 5/12* (2006.01)
*B23C 5/20* (2006.01)
(Continued)

(52) U.S. Cl.
CPC . *B23C 5/202* (2013.01); *B23C 5/06* (2013.01); *B23C 5/207* (2013.01);
(Continued)

(58) Field of Classification Search
CPC ........ B23C 5/202; B23C 5/205; B23C 5/207; B23C 2200/08; B23C 2200/20; B23C 2200/201; B23C 2200/208; Y10T 407/23; Y10T 407/1924
See application file for complete search history.

(56) References Cited

U.S. PATENT DOCUMENTS 3,800,379 A * 4/1974 Hopkins ..................... 407/113
5,388,932 A * 2/1995 DeRoche et al. ............ 407/113
(Continued)

FOREIGN PATENT DOCUMENTS

CA 2362676 A1 * 9/2000 ............. B23B 27/14
CN 1148829 A 4/1997
(Continued)

OTHER PUBLICATIONS

International Search Report for corresponding Application No. PCT/JP2012/080447, date of mailing Jan. 22, 2013, 2 pages.
(Continued)

*Primary Examiner* — Will Fridie, Jr.
*Assistant Examiner* — Donte Brown
(74) *Attorney, Agent, or Firm* — Ditthavong & Steiner, P.C.

(57) ABSTRACT

Corner cutting edges (7 and 8) each having a side portion connected to a minor cutting edge and curved in the same direction as that in which the minor cutting edge is curved are formed on opposite sides of the minor cutting edge (6) of an indexable cutting insert for milling including a major cutting edge (5) formed of a ridge formed by an intersection of a rake face and a flank face and the minor cutting edge (6) for finish machining curved in a convex manner when viewed from a direction perpendicular to the flank face, and the minor cutting edge (6) continues to the major cutting edge (5) via the corner cutting edges (7 and 8).

6 Claims, 8 Drawing Sheets

(51) Int. Cl.
*B23C 5/06* (2006.01)
*B23C 5/00* (2006.01)

(52) U.S. Cl.
CPC .. *B23B 2200/123* (2013.01); *B23C 2200/0455* (2013.01); *B23C 2200/203* (2013.01); *B23C 2200/208* (2013.01); *B23C 2210/66* (2013.01); *Y10T 407/235* (2015.01)

(56) References Cited

U.S. PATENT DOCUMENTS

| | | | |
|---|---|---|---|
| 5,437,522 A * | 8/1995 | Satran et al. | 407/42 |
| 5,803,674 A * | 9/1998 | Satran et al. | 407/42 |
| 5,807,031 A * | 9/1998 | Arai et al. | 407/113 |
| 5,951,214 A * | 9/1999 | Rothballer et al. | 407/42 |
| 6,669,412 B1 * | 12/2003 | Hirose et al. | 407/113 |
| 7,073,987 B2 * | 7/2006 | Hecht | 407/113 |
| 7,972,091 B2 * | 7/2011 | Svenningsson et al. | 407/113 |
| 7,976,250 B2 * | 7/2011 | Fang et al. | 407/113 |
| 8,950,984 B2 * | 2/2015 | Choi et al. | 407/114 |
| 2003/0077131 A1 * | 4/2003 | Wiman et al. | 407/114 |
| 2004/0146365 A1 * | 7/2004 | Usui et al. | 407/113 |
| 2008/0292415 A1 * | 11/2008 | Kuroda et al. | 407/61 |
| 2009/0285646 A1 * | 11/2009 | Oprasic et al. | 407/114 |
| 2010/0080662 A1 * | 4/2010 | Satran et al. | 407/40 |
| 2012/0093596 A1 * | 4/2012 | Ishi | 407/113 |
| 2012/0282048 A1 * | 11/2012 | Kountanya | 407/113 |
| 2014/0126974 A1 * | 5/2014 | Koga | 409/132 |
| 2014/0178135 A1 * | 6/2014 | Yamamoto | 407/42 |
| 2014/0193216 A1 * | 7/2014 | Maeta et al. | 407/113 |

FOREIGN PATENT DOCUMENTS

| | | | | |
|---|---|---|---|---|
| CN | 101579755 A | 11/2009 | | |
| CN | 101730601 A | 6/2010 | | |
| DE | 19703569 A1 * | 10/1997 | | B23B 27/16 |
| EP | 1157768 A1 * | 11/2001 | | B23C 5/22 |
| EP | 1872889 A1 * | 1/2008 | | B23C 5/20 |
| EP | 2495060 A1 | 9/2012 | | |
| JP | 06179111 A * | 6/1994 | | B23C 5/20 |
| JP | 07237026 A * | 9/1995 | | B23C 5/20 |
| JP | 08066815 A * | 3/1996 | | B23C 5/20 |
| JP | 08174327 A * | 7/1996 | | B23C 5/20 |
| JP | 08257822 A * | 10/1996 | | B23C 5/20 |
| JP | 08323510 A * | 12/1996 | | B23B 27/22 |
| JP | 09174323 A * | 7/1997 | | B23C 5/20 |
| JP | 10138033 A * | 5/1998 | | B23C 5/20 |
| JP | 11347826 A | 12/1999 | | |
| JP | 3970929 B2 | 6/2007 | | |
| JP | 2009274207 A | 11/2009 | | |
| JP | 2010532271 A | 10/2010 | | |
| JP | 2011104738 A * | 6/2011 | | B23C 5/06 |
| WO | WO 9532071 A1 * | 11/1995 | | B23B 27/16 |
| WO | WO 9635538 A1 * | 11/1996 | | B23C 5/22 |
| WO | WO 2008132757 A1 * | 11/2008 | | B23C 5/22 |
| WO | WO 2009005218 A1 * | 1/2009 | | B23B 27/04 |
| WO | WO 2011001939 * | 1/2011 | | B23C 5/20 |
| WO | 2011052340 A1 | 5/2011 | | |
| WO | 2011092883 A1 | 8/2011 | | |
| WO | 2011099495 A1 | 8/2011 | | |
| WO | WO 2013008565 A1 * | 1/2013 | | B23C 5/20 |
| WO | WO 2014021314 A1 * | 2/2014 | | B23C 5/20 |

OTHER PUBLICATIONS

Chinese Office Action corresponding to Patent Application No. 201280031483.0, dated Feb. 15, 2015; 17 pages.

European Office Action for related European Patent Application No. 12850798.5-1709 dated Sep. 2, 2015, 6 Pages.

* cited by examiner

F. A. 0°

F. A. −

F. A. 0°

INDEXABLE CUTTING INSERT FOR MILLING

TECHNICAL FIELD

The present invention relates to an indexable cutting insert for milling (hereinafter simply referred to as a cutting insert), and more particularly to a cutting insert that includes minor cutting edges used as flat cutting edges and that is devised to improve the surface roughness of a surface machined by the minor cutting edges.

BACKGROUND ART

Examples of the above-described cutting insert for milling that includes minor cutting edges are cutting inserts disclosed in the following PTL 1 and PTL 2.

A cutting insert that is described in PTL 1 includes major cutting edges and minor cutting edges each of which continues to a corresponding one of the major cutting edges via a transition region, and each of the minor cutting edges is configured as a cutting edge that is curved in a convex manner when viewed from the side in a direction perpendicular to a flank face.

A cutting insert that is described in PTL 2 includes auxiliary cutting edges (minor cutting edges) each having a protruding shape that is oblique to a reference plane parallel to a top surface. Corner transition parts (so-called noses R) are present on opposite sides of each of the auxiliary cutting edges. One of the corner transition parts (hereinafter referred to as a portion A) connects the auxiliary cutting edge and a corresponding one of non-chip-removing cutting edges having the largest height to each other, and the other one of the corner transition parts (hereinafter referred to as a portion B) connects the auxiliary cutting edge and a corresponding one of main cutting edges having a small height to each other.

In this configuration, the other one of the corner transition parts (the portion B) is capable of smoothly connecting the auxiliary cutting edge and the corresponding main cutting edge to each other by being formed as a cutting edge having a protruding shape when viewed from the side; however, the one of the corner transition parts (the portion A) cannot maintain a protruding shape because the difference in the heights of the auxiliary cutting edge and the corresponding non-chip-removing cutting edge needs to be accommodated, and thus, there is a difference in level between the non-chip-removing cutting edge and the auxiliary cutting edge.

CITATION LIST

Patent Literature

PTL 1: Japanese Patent No. 3970929
PTL 2: Japanese Unexamined Patent Application Publication No. 2009-274207

SUMMARY OF INVENTION

Technical Problem

In a cutting insert that is described in PTL 1, only minor cutting edges are curved in a convex manner when viewed from the side, and ends of each of the minor cutting edges continue at an angle to transition regions on opposite sides of the minor cutting edge. Because of this, especially when the transition regions that connect the minor cutting edges and the major cutting edges to each other are large, seams (so-called feed marks) on a machined surface on which finish machining has been performed with the minor cutting edges become large, and as a result, a good surface roughness cannot be obtained.

A surface that is being machined with the minor cutting edges of the cutting insert of PTL 1 is exaggeratedly illustrated in FIG. 13A. Although it is considered to be ideal for a path of the cutting edges to form regular waves each having a pointed top on a surface on which finish machining has been performed with convex arc-shaped minor cutting edges, when the cutting insert of PTL 1 is used, as illustrated in the drawing, the path of the cutting edges of the transition regions at the corresponding ends of each of the minor cutting edges becomes seams on the machined surface. Thus, waves each having a top that is not pointed are generated, and the seams on the machined surface become large.

In the case of an indexable milling cutter, when a cutting insert is mounted on a cutter body, a mounting error may sometimes occur. A surface that is being machined in a state where such a mounting error has occurred is exaggeratedly illustrated in FIG. 13B. The surface is being machined in a state where a face angle F.A is deviated from a normal mounting position where the mounting error is zero to a minus side (in a clockwise direction in FIG. 15). Accordingly, in the cutting insert of PTL 1, whether the face angle F.A is deviated to a plus side (in a counterclockwise direction in FIG. 15) or the minus side, the shapes of feed marks will be distorted, and the surface roughness of a machined surface further deteriorates.

Characteristics of a surface that is being machined with auxiliary cutting edges of a cutting insert of PTL 2 are exaggeratedly illustrated in FIGS. 14A and 14B. In the case where the cutting insert of PTL 2 is normally mounted on a cutter body, as illustrated in FIG. 14A, seams on a machined surface can be kept small. However, in the case where the cutting insert is obliquely mounted in a direction in which a portion A, which has a configuration similar to that of a portion of the insert of PTL 1 in which one of the minor cutting edges and the corresponding transition region are connected to each other, tilts to the tip of a corresponding one of the auxiliary cutting edges (to a side on which a face angle F.A is deviated to the minus side) due to errors in the machining of the cutter body and the cutting insert, as illustrated in FIG. 14B, seams on a machined surface become large, and the surface roughness deteriorates.

Note that, in the cutting inserts of PTL 1 and PTL 2, the influence of the shapes of the transition regions (the transition parts) can be eliminated if the feed during machining is reduced; however, this method is not preferable because using this method results in a decrease in the machining efficiency.

It is an object of the present invention to enable a cutting insert for milling that includes minor cutting edges for finish machining to obtain a good surface roughness without reducing the feed in the case where the cutting insert is normally mounted on a cutter body, and also in the case where a mounting error occurs.

Solution to Problem

In order to solve the above-described problem, in the present invention, corner cutting edges each having a side portion that is connected to a minor cutting edge and that is curved in a direction the same as a direction in which the minor cutting edge is curved are formed on opposite sides of the minor cutting edge of an indexable cutting insert for milling that includes a major cutting edge that is formed of a ridge formed by an intersection of a rake face and a flank face and the minor cutting edge for finish machining that continues to the major cutting edge at an angle with respect to the major cutting edge and that has a polygonal shape in which the minor cutting edge is curved in a convex manner when viewed from a direction perpendicular to the flank face as a basic shape, and the minor cutting edge continues to the major cutting edge via the corner cutting edges.

In the above-described cutting insert, it may be considered that the side portion of each of the corner cutting edges that is connected to the minor cutting edge is a cutting edge that has a curvature the same as that of the minor cutting edge and that is formed as an extension of the minor cutting edge; however, it is preferable that each of the side portions be a cutting edge in which a flank face is formed of two or more surfaces.

As a specific example of a preferred embodiment, there is considered a cutting insert in which the minor cutting edge is formed of a ridge line of an arc having a radius R, and the side portion of each of the corner cutting edges connected to the minor cutting edge is formed of a ridge line of an arc having a radius R1 that satisfies a condition of R≤R1, and a side portion of each of the corner cutting edges connected to the major cutting edge is formed of a straight line or a ridge line of a curved line having a curvature smaller than a curvature of the ridge line of the radius R1 (the curved line need not be in the form of an arc).

In addition, it is also preferable that, in a cutting insert in which a rake face is formed on a top surface and a bottom surface, a seating surface that is flat and is to be held on a supporting seat provided on the side of a cutter body be formed in a center portion of each of the top surface and the bottom surface, and it is preferable that the seating surface be formed at a position lower than the major and minor cutting edges, and that a recess extending across the seating surface be further formed in a center portion between insert corners of the seating surface.

Here, the term "insert corner" refers to each of corners of an insert having the basic shape. In addition, in the present invention, the term "seating surface" refers to a region in which a plane formed at a position lower than the cutting edges is in contact with the supporting seat. In the case where the plane has an area larger than that of the supporting seat, the recess may sometimes be formed in such a manner as to extend across only the region in which the plane is in contact with the supporting seat. In this case, a portion of the plane that is present outside the region in which the plane is in contact with the supporting seat is left behind in a state of continuing to the seating surface at opposite sides of the recess.

It is preferable that the depth of the recess be in a range of about 0.2 mm to 1.5 mm. It is appropriate that the width of the recess in a direction along the cutting edge be in a range of about one-third to one-fifth of the side length of the insert having the basic shape.

The cutting insert according to the present invention can include a breaker groove that processes chips on top and bottom surfaces thereof along the cutting edges. In the case where the breaker groove is used in combination with the recess, the breaker groove can be used as part of the recess.

Advantageous Effects of Invention

In a cutting edge according to the present invention, corner cutting edges each having a side portion that is connected to a minor cutting edge and that is curved in a direction the same as a direction in which the minor cutting edge is curved are formed on opposite sides of the minor cutting edge, and the minor cutting edge continues to a major cutting edge via the corner cutting edges. Therefore, there is no significant difference in level between the minor cutting edge and the major cutting edge. As a result, seams on a machined surface do not become large in the case where the cutting insert is normally mounted on a cutter body, and also in the case where a mounting error occurs.

In the case where the cutting insert is normally mounted on a cutter body, a machined surface that is close to an ideal machined surface can be obtained. In addition, in the case where the cutting insert is mounted with a face angle somewhat deviated to a plus side or a minus side, seams on a machined surface do not become significantly large. The cross-sectional shape of a feed mark is not significantly deformed, and a good surface roughness is maintained.

DESCRIPTION OF EMBODIMENTS

Figure 7:
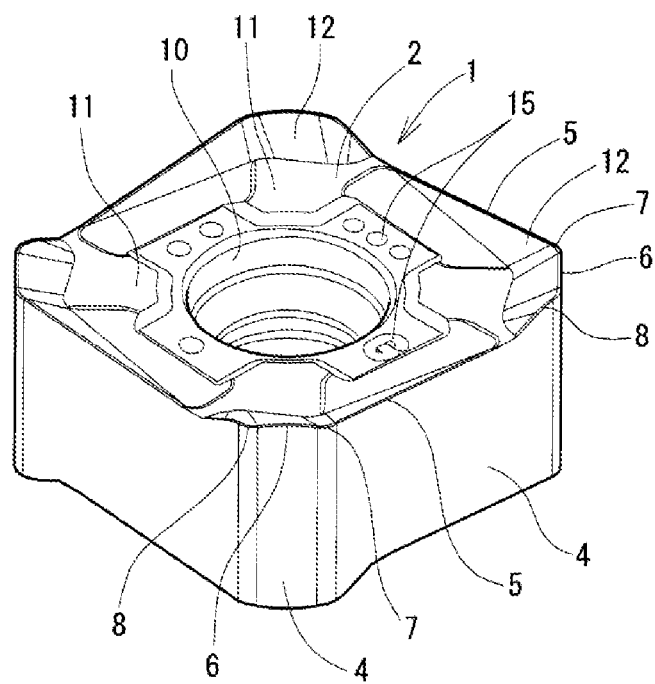
FIG. 7 is a perspective view illustrating a second embodiment of the cutting insert according to the present invention.
Figure 8:
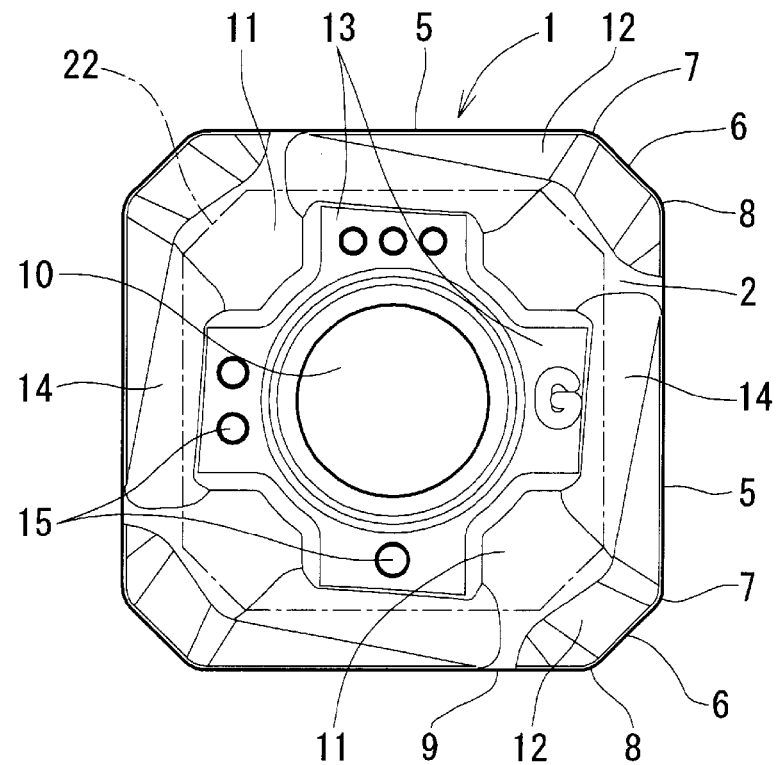
FIG. 8 is a plan view of the cutting insert illustrated in FIG. 7.
Figure 9:
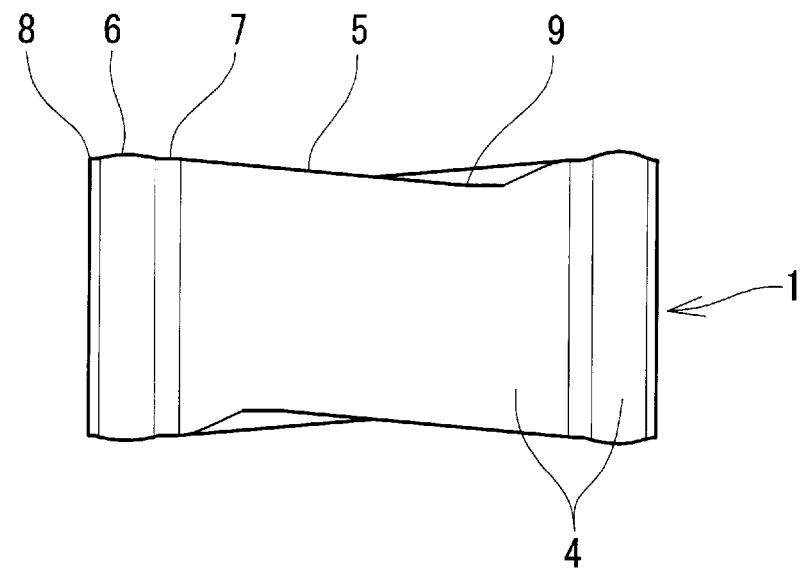
FIG. 9 is a side view of the cutting insert illustrated in FIG. 7.

Embodiments of a cutting insert according to the present invention will be described below with reference to FIG. 1 to FIG. 9 of the accompanying drawings. A first embodiment of the cutting insert according to the present invention (without breaker grooves) is illustrated in FIG. 1 to FIG. 6, and a second embodiment of the cutting insert (with breaker grooves) is illustrated in FIG. 7 to FIG. 9.

In both the embodiments, a cutting insert that has a quadrangular shape as a basic shape and is formed by removing four corners of the basic shape in such a manner as to eventually have an octagonal shape when viewed in plan is illustrated as an example. However, the present invention can be applied to cutting inserts having shapes such as triangular, pentagonal, and hexagonal shapes each of which has a different number of corners from that of the cutting insert illustrated in the drawings.

In both the first and second embodiments, four edges at the periphery of each of a top surface 2 and a bottom surface 3 (ridge lines at positions that intersect side surfaces 4) are to be used as major cutting edges 5, and edges at corners between two corresponding adjacent major cutting edges are to be used as minor cutting edges (flat cutting edges) 6.

Note that, since a configuration on the side of the bottom surface 3 is the same as that on the side of the top surface 2, only the configuration on the side of the top surface will be described herein.

In a cutting insert 1 of the first embodiment illustrated in FIG. 1 to FIG. 6, the position of each of the minor cutting edges 6 is the highest, and each of the major cutting edges 5 is caused to tilt in a direction in which the position thereof becomes lower with increasing distance from a corresponding one of the minor cutting edges 6. Corner cutting edges 7 and 8 are formed on opposite sides of each of the minor cutting edges 6.

Figure 1:
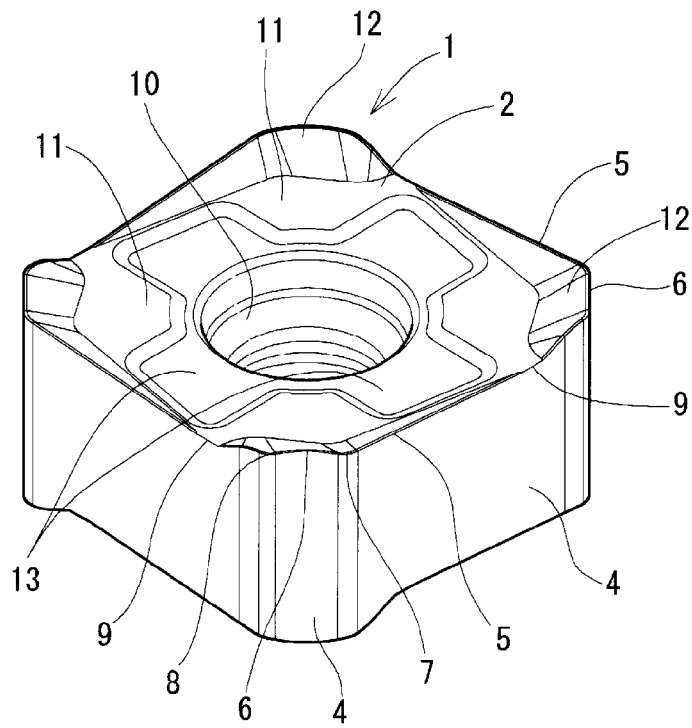
FIG. 1 is a perspective view illustrating a first embodiment of a cutting insert according to the present invention.
Figure 2:
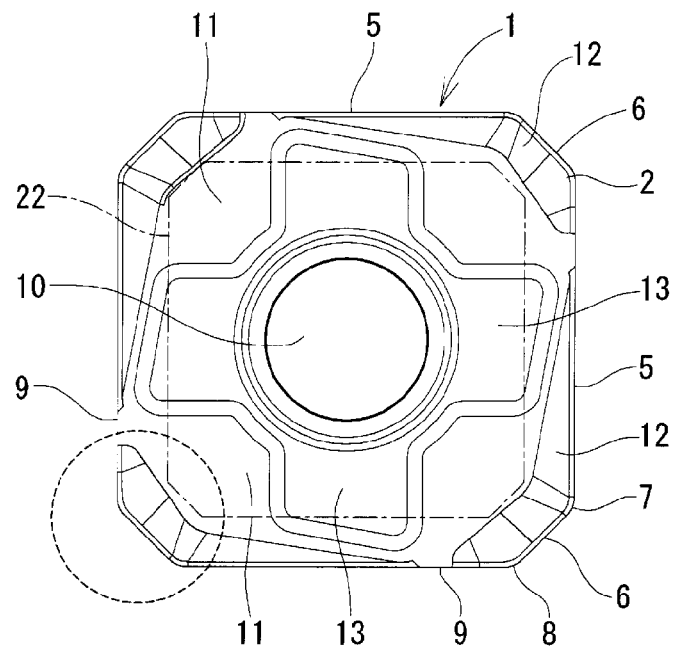
FIG. 2 is a plan view of the cutting insert illustrated in FIG. 1.
Figure 3:
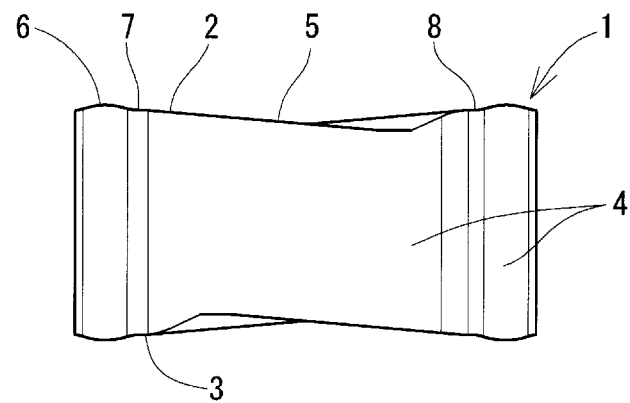
FIG. 3 is a side view of the cutting insert illustrated in FIG. 1.
Figure 4:
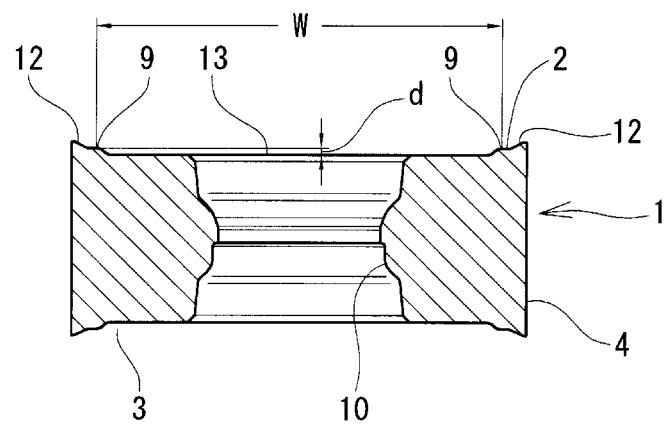
FIG. 4 is a sectional view of the cutting insert illustrated in FIG. 1.
Figure 5:
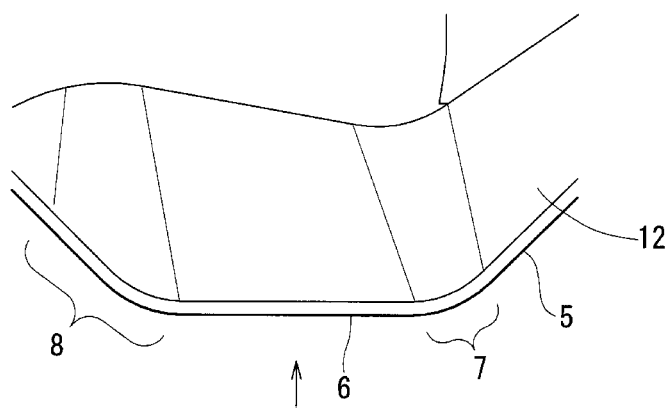
FIG. 5 is an enlarged plan view of a circle frame portion in FIG. 2.
Figure 6:
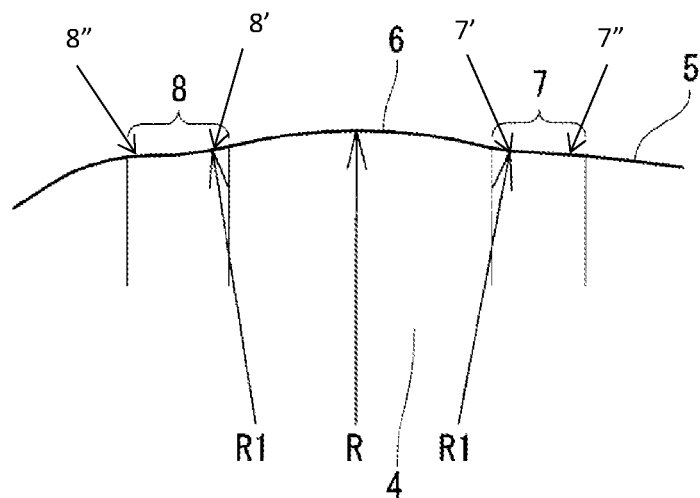
FIG. 6 is a diagram illustrating a minor cutting edge and a corner cutting edge seen from the direction of an arrow in FIG. 5.

Each of the minor cutting edges 6 is formed in such a manner as to be curved in a convex manner when viewed from a direction (the direction of the arrow in FIG. 5) perpendicular to a corresponding one of flank faces (side surfaces 4 in corner portions of the insert having the basic shape in the drawing) (see FIG. 6). Although each of the minor cutting edges 6 is illustrated as an arc-shaped cutting edge having a fixed curvature, a curvilinear cutting edge the curvature of which becomes smaller with decreasing distance from opposite ends of the curvilinear cutting edge may be also considered.

In each of the corner cutting edges 7 and each of the corner cutting edges 8, a side portion that is connected to the corresponding minor cutting edge 6 is a cutting edge that is curved in a direction the same as a direction in which the minor cutting edge 6 is curved, and a side portion that is connected to the corresponding major cutting edge 5 is a cutting edge that has a linear shape or a substantially linear shape.

As illustrated in FIG. 6, in the exemplary cutting insert 1, the minor cutting edge 6 is formed of a ridge line of an arc having a radius R, and the side portion 7' and 8' of each of the corner cutting edges 7 and 8 that is connected to the minor cutting edge 6 is formed of a ridge line of an arc having a radius R1 (although the radius R1 is larger than the radius R, the radius R1 may be equal to the radius R). Although the side portion 7" and 8" of each of the corner cutting edges 7 and 8 that is connected to the major cutting edge 5 is formed of a ridge line of an oblique straight line, the portion may be formed using a curved line that approximates to a straight line and has a curvature smaller than that of the ridge line of the radius R1.

Note that one end portion of the minor cutting edge 6 is directly connected to the major cutting edge 5 via the corner cutting edge 7. The other end portion of the minor cutting edge 6 is connected to the major cutting edge 5 that is at a position adjacent to the other end portion via the corner cutting edge 8 and a ridge line 9 that is left between the corner cutting edge 8 and a terminal portion of the major cutting edge 5 and that is parallel to a seating surface. The ridge line 9 is not essential, and in the case where the ridge line 9 is not present, the minor cutting edge 6 is directly connected to the major cutting edge 5 that is at the position adjacent to the minor cutting edge 6 via the corner cutting edge 8.

In the drawings, a reference numeral 10 denotes a mounting hole that is formed in the center of the cutting insert 1 in such a manner as to extend all the way through in the thickness direction of the cutting insert 1, a reference numeral 11 denotes the seating surface that is a plane formed at a position lower than the major cutting edges 5, and reference numerals 12 denote rake faces that are oblique surfaces formed between the major and minor cutting edges and the seating surface 11.

In addition, recesses 13 are formed in a center portion of the top surface 2. The recesses 13 are formed in center portions between insert corners of the seating surface 11 (center portions between the corners of the insert having the basic shape) in such a manner as to extend across the seating surface 11.

The seating surface 11 is divided into four portions by forming the recesses 13, and the seating surface is not present in each of the center portions between the insert corners. In cutting inserts manufactured by powder metallurgy, and in particular, in a cutting insert that includes portions each of which has a non-uniform thickness, a difference is likely to occur between the molding pressures applied to the portions during press forming of a raw material powder, and in addition, variations are likely to occur in the degrees of shrinkage of the portions that occurs during sintering that is performed after the molding. Therefore, a seating surface is likely to deform in such a manner as to expand toward the top in the periphery of the centers between corners of an insert having the basic shape.

When such expansion occurs, the flatness of the seating surface deteriorates, and connection between the seating surface and a supporting seat becomes unstable resulting in deviation (error) in the mounting position and mounting posture of the cutting insert 1 with respect to a cutter body. This also becomes a factor in the reduction of the surface roughness of a machined surface; however, such a problem is eliminated by forming the recesses 13. Therefore, the exemplary cutting insert 1 in which the recesses 13 are formed can further improve the surface roughness of a machined surface.

It is preferable that the depth d of each of the recesses 13 be in a range of about 0.2 mm to 1.5 mm. In the case where the depth d is less than 0.2 mm, the depth is insufficient, and thus, it is concerned that suppression of expansion in the center portions between the insert corners on the seating surface becomes insufficient. Alternatively, in the case where the depth d is greater than 1.5 mm, further improvement of the seating stability cannot be expected, and the entire strength of the cutting insert is simply decreased.

It is appropriate that the width W of each of the recesses 13 in a direction along the corresponding major cutting edge 5 be in a range of one-third to one-fifth of the side length of the insert having the basic shape.

The basic configuration of a cutting insert 1 of the second embodiment illustrated in FIG. 7 to FIG. 9 is the same as that of the first embodiment. In the second embodiment, breaker grooves 14 are formed on a top surface 2 along corresponding major cutting edges 5, which is a difference between the second embodiment and the first embodiment.

The breaker grooves 14 are formed between rake faces 12 on the side of the major cutting edges 5 and the recesses 13, and each of the breaker grooves 14 is also used as part of the corresponding recess 13.

Reference numerals 15 in FIG. 7 and FIG. 8 denote identification marks that determine the positions of cutting edges that affect a cutting operation. Rotation of the cutting edges (replacement of used cutting edges with unused cutting edges) can be accurately performed with the identification marks 15, however; the identification marks 15 are merely preferable elements.

Note that, in the cutting insert 1 of the first embodiment, although the plane that forms the seating surface 11 extends outside the outline of the supporting seat 22, a portion of the plane that is present outside an area in which the plane and the supporting seat 22 are in contact with each other is not considered as the seating surface.

In the cutting insert of the first embodiment configured as described above, the corner cutting edges 7 and 8 that are curved in the same direction as that in which the corresponding minor cutting edge is curved are formed on opposite sides of the minor cutting edge 6, and thus, there is no significant difference in level between the minor cutting edge 6 and the corresponding major cutting edge 5. Therefore, seams on a machined surface do not become large, and a good surface roughness can be obtained.

Figure 12A:
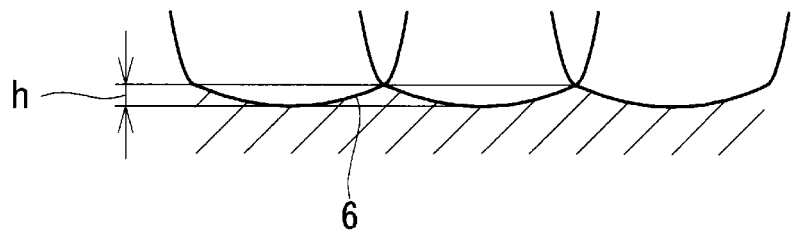
FIG. 12A is a sectional view exaggeratedly illustrating the state of a machined surface in the case where the cutting insert according to the present invention is normally mounted.

In the case where the cutting insert 1 is normally mounted on the cutter body, as illustrated in FIG. 12A, ideal feed marks in which the height h of each of waves is small, and in which the top of each of the waves is pointed are generated, and the machined surface is finished in such a manner as to have a good surface roughness.

Figure 12B:
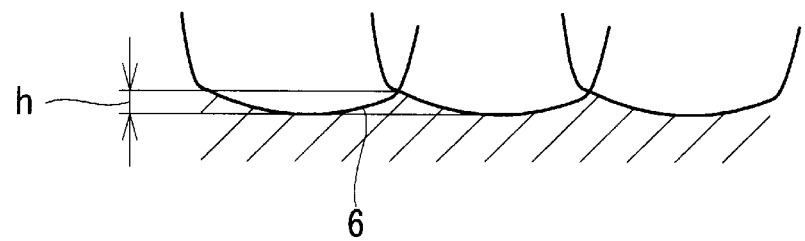
FIG. 12B is a sectional view exaggeratedly illustrating the state of a machined surface in the case where the cutting insert according to the present invention is mounted with a face angle deviated to a minus side.
Figure 13A:
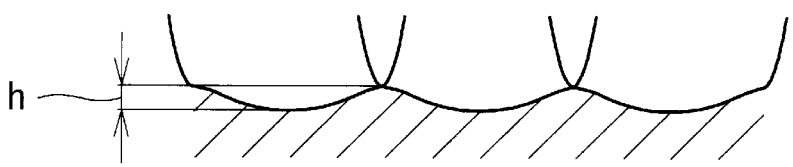
FIG. 13A is a sectional view exaggeratedly illustrating the state of a machined surface in the case where the cutting insert of PTL 1 is normally mounted.
Figure 13B:
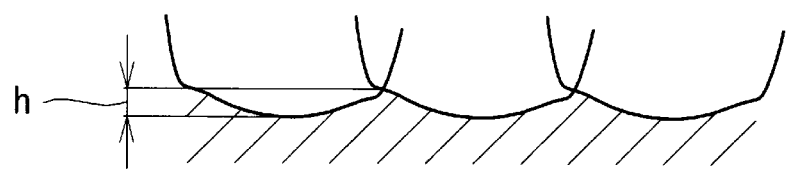
FIG. 13B is a sectional view exaggeratedly illustrating the state of a machined surface in the case where the cutting insert of PTL 1 is mounted with a face angle deviated to a minus side.
Figure 14A:
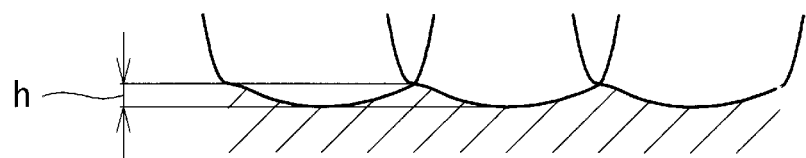
FIG. 14A is a sectional view exaggeratedly illustrating the state of a machined surface in the case where the cutting insert of PTL 2 is normally mounted.
Figure 14B:
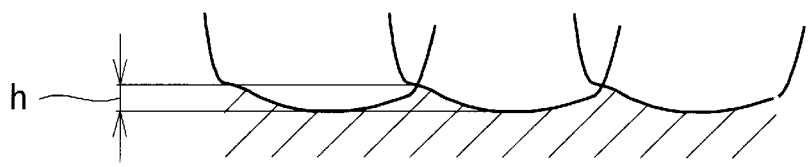
FIG. 14B is a sectional view exaggeratedly illustrating the state of a machined surface in the case where the cutting insert of PTL 2 is mounted with a face angle deviated to a minus side.
Figure 15:
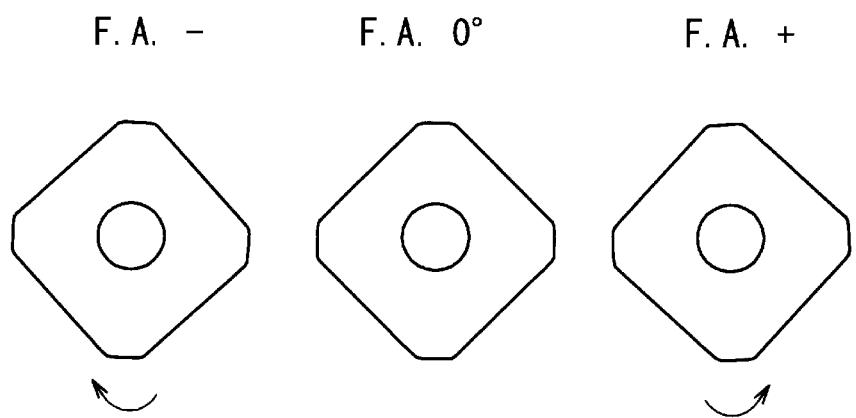
FIG. 15 is a diagram for describing directions of deviation of a face angle.

In addition, as illustrated in FIG. 12B, in the case where the cutting insert 1 is mounted with the face angle F.A deviated to the minus side (or the plus side), seams on a machined surface do not become significantly large, and a good machined surface having feed marks having the cross-sectional shapes that are not significantly deformed can be obtained.

The seating stability of the cutter body to the supporting seat is improved by forming the recesses 13. Because of this, errors in mounting precision are reduced, and thus, further improvement of the roughness of a machined surface can be expected.

Figure 10:
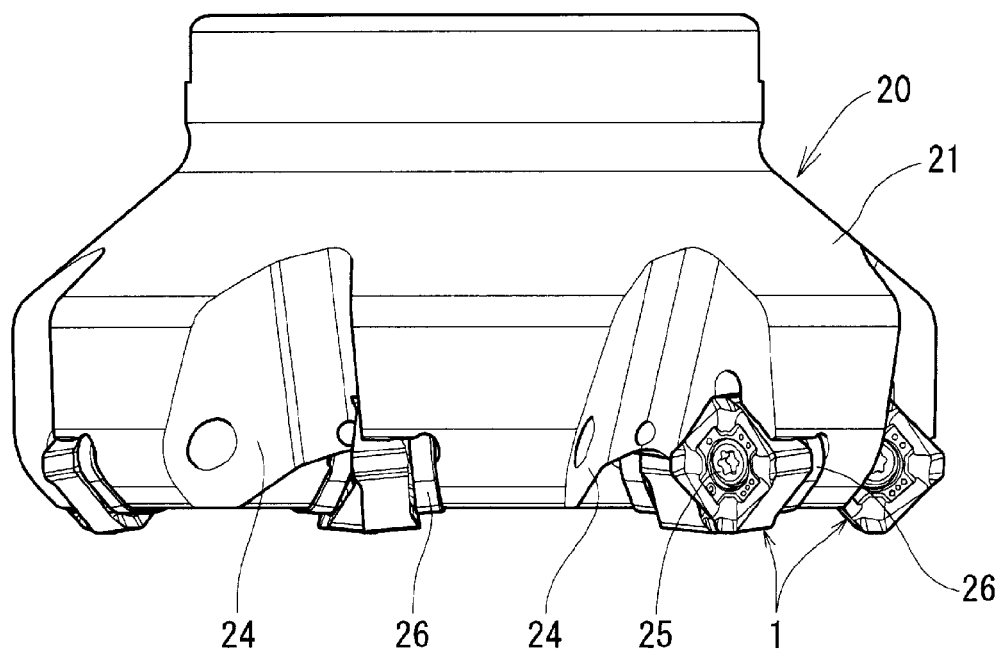
FIG. 10 is a perspective view illustrating an example of a milling cutter using the cutting insert according to the present invention.
Figure 11:
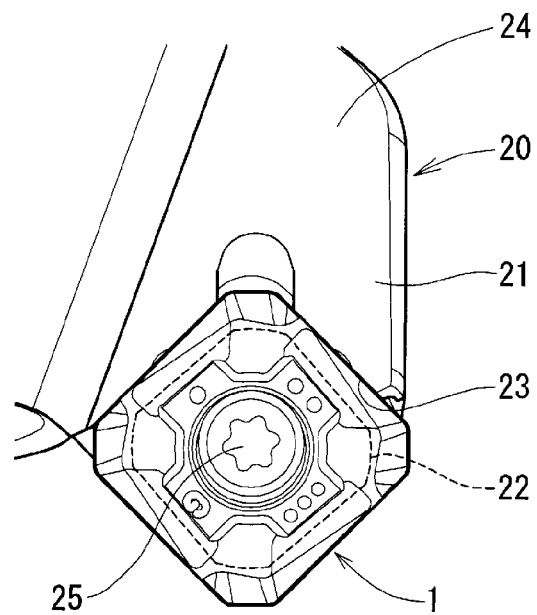
FIG. 11 is a diagram illustrating a cutting insert-mounting portion of the milling cutter illustrated in FIG. 10 seen from the front in a rotation direction.

An example of a milling cutter using the exemplary cutting insert is illustrated in FIG. 10 and FIG. 11. In a milling cutter 20 that is illustrated in the drawings, a plurality of seating grooves 23 and a plurality of chip pockets 24 are formed in the outer periphery of a cutter body 21 at a predetermined pitch in a rotation direction.

The cutting insert 1 (the cutting insert of the second embodiment is illustrated in the drawings) is inserted into each of the seating grooves 23, and each of the cutting inserts 1 is fixed on the supporting seat 22 with a mounting screw 25.

Shim plates 26 (see FIG. 10) are mounted on the cutter body 21, and each of the supporting seats 22 is formed in a corresponding one of the shim plates 26; however, each of the supporting seats 22 may be directly formed in the cutter body 21.

Note that, there is a cutting insert that is called a vertical insert among known cutting inserts for milling. The present invention can also be applied to such a vertical insert in which side surfaces, ridges formed by intersections of the side surfaces and the top surface (or the bottom surface), and ridge lines formed between each of adjacent two of the side surfaces are used as rake faces, major cutting edges, and minor cutting edges, respectively.

REFERENCE SIGNS LIST 1 cutting insert
2 top surface
3 bottom surface
4 side surface
5 major cutting edge
6 minor cutting edge
7, 8 corner cutting edge
9 ridge line that does not affect cutting operation
10 mounting hole
11 seating surface
12 rake face
13 recess
14 breaker groove
15 identification mark
20 milling cutter
21 cutter body
22 supporting seat
23 seating groove
24 chip pocket
25 mounting screw
26 shim plate
h height of wave

The invention claimed is:

1. An indexable cutting insert for milling, the insert comprising:
    a major cutting edge that is formed of a ridge formed by an intersection of a rake face and a flank face;
    a minor cutting edge continuing to the major cutting edge being curved in a convex manner making the middle of the minor cutting edge the highest peak when viewed from a direction perpendicular to the flank face corresponding to the minor cutting edge;
    a seating surface positioned lower than the major and minor cutting edges; and
    a corner cutting edge formed on opposite sides of the minor cutting edge, the corner cutting edge having a curved side portion and a straight side portion, connected to the minor cutting edge with the curved side portion, and connected to the major cutting edge with the straight side portion, wherein:
    the curved side portion being curved in a convex manner when viewed from the direction perpendicular to the flank face corresponding to the minor cutting edge,
    the straight side portion having a linear shape or a substantially linear shape,
    the indexable cutting insert for milling has a polygonal shape as a basic shape,
    the position of the minor cutting edge is the highest, and
    the minor cutting edge continues to the major cutting edge via the corner cutting edges.

2. The indexable cutting insert for milling according to claim 1, wherein:
    the minor cutting edge is formed of a ridge line of an arc having a radius R, and
    the curved side portion of each of the corner cutting edges connected to the minor cutting edge is formed of a ridge line of an arc having a radius R1 that satisfies a condition of $R \leq R1$, and the straight side portion of each of the corner cutting edges connected to the major cutting edge is formed of a straight line.

3. The indexable cutting insert for milling according to claim 1, wherein:
    the rake face is formed on a top surface and a bottom surface,
    a seating surface that is flat and is to be held on a supporting seat on a side of a cutter body is formed in a center portion of each of the top surface and the bottom surface,
    the seating surface is positioned lower than the major and minor cutting edges, and a recess extending across the seating surface is formed in a center portion between insert corners of the seating surface.

4. The indexable cutting insert for milling according to claim 3, wherein:
a breaker groove is formed on the top and bottom surfaces along a cutting edge, and
the breaker groove forms part of the recess.

5. The indexable cutting insert for milling according to claim 2, wherein:
the rake face is formed on a top surface and a bottom surface,
a seating surface that is flat and is to be held on a supporting seat on a side of a cutter body is formed in a center portion of each of the top surface and the bottom surface,
the seating surface is positioned lower than the major and minor cutting edges, and
a recess extending across the seating surface is formed in a center portion between insert corners of the seating surface.

6. The indexable cutting insert for milling according to claim 5, wherein:
a breaker groove is formed on the top and bottom surfaces along a cutting edge, and
the breaker groove forms part of the recess.

* * * * *